May 2, 1950
M. IRVINE
2,506,022
BALANCED REGULATOR FOR IRRIGATION
Filed Dec. 16, 1946
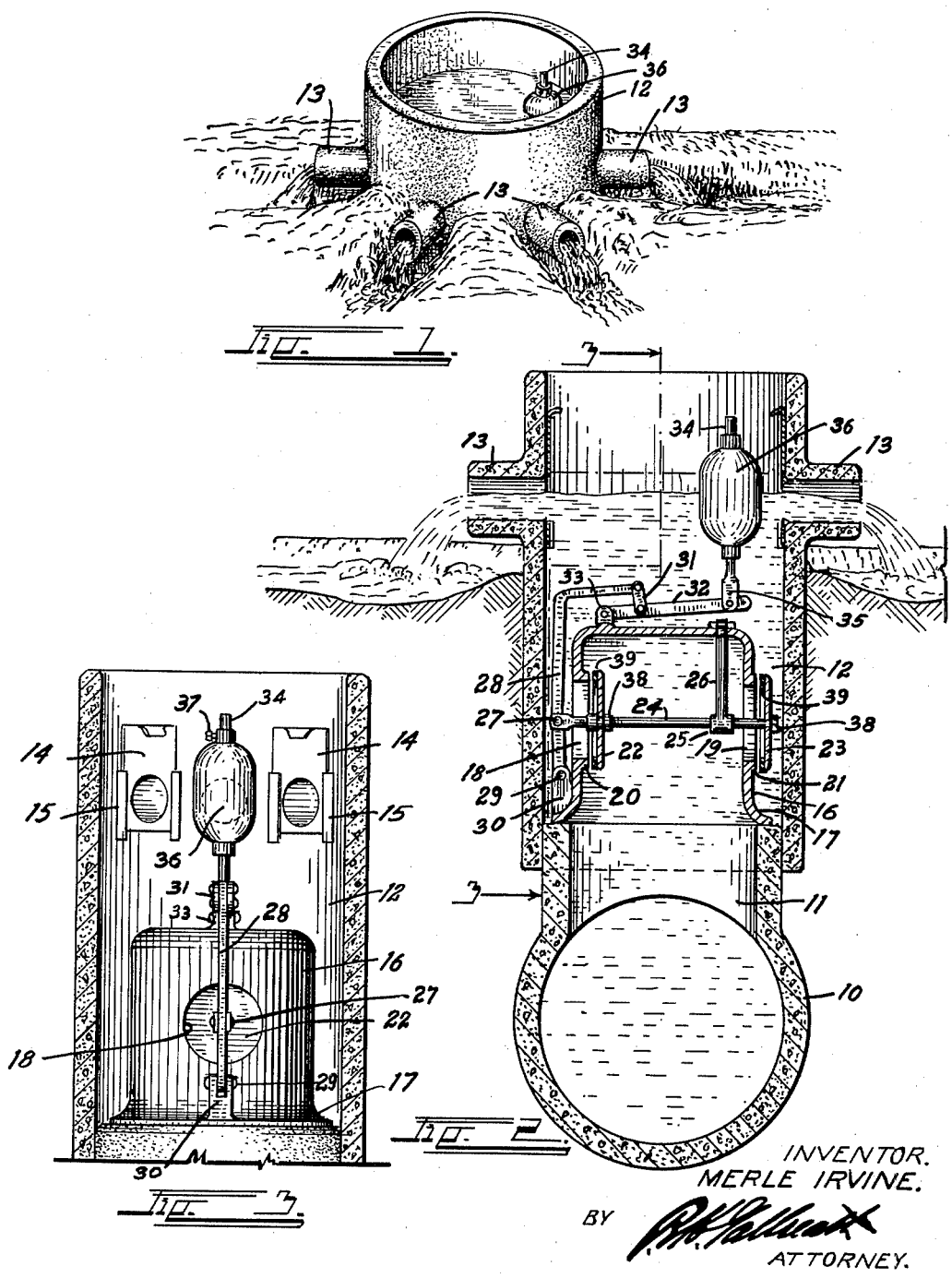
INVENTOR.
MERLE IRVINE.
BY
ATTORNEY.

Patented May 2, 1950

2,506,022

UNITED STATES PATENT OFFICE 2,506,022

BALANCED REGULATOR FOR IRRIGATION

Merle Irvine, Los Angeles, Calif.

Application December 16, 1946, Serial No. 716,659

5 Claims. (Cl. 137—68)

This invention relates to a water flow regulator for irrigation systems, and relates more particularly to the modern type of irrigation system in which the water is distributed over the field in underground pipes, usually of concrete. In such a system the water is distributed from a main pipe, known as a "main line header." The main line header feeds at intervals to vertical stand pipes. Lateral distribution pipes extend from each of the standpipes and terminate in risers, known as "buckets." Each bucket is provided with a plurality of discharge spouts, from each of which the water is fed into a land ditch for final distribution. Each discharge spout is controlled by a small slide valve.

The function of the stand-pipes is, first, to reduce the main line pressure, and second, to furnish a constant head of water to the laterals. The flow to the laterals is usually controlled by gate valves operable from the top of each standpipe.

The manual control of the gate valves in the stand-pipe, and the slide valves in the buckets, is an exceedingly difficult procedure, for the changing of the setting of any one valve in the system varies the head of water in the lateral feeding to, or discharging from, that valve, which requires re-setting of all the other valves, not only in that particular bucket, but possibly in all buckets fed from that particular stand-pipe.

This re-setting procedure is continuous all the time the land is being irrigated, due to the varying rate of absorption of the water by the land, variations in the head pressure on the water, and variations in the sizes of the plots being irrigated from any particular bucket or lateral. This constant re-setting is necessary in order to prevent overflow at the buckets and stand pipes and to insure sufficient water to fully irrigate the land in the required time.

The principal object of this invention is to provide automatic means for controlling the water level in each of the buckets and standpipes of an underground irrigation system so that a uniform head will be maintained therein, regardless of variations in the water supply.

Attempts have been made to control the flow of water in such a system by means of float-actuated diaphragm valves. These attempts have not been successful due to the extreme pressure on the diaphragm, requiring an exceedingly large float to operate. Such valves have the disadvantage of sticking open or shut, due to corrosion, sediment, etc., and the life of such diaphragms is very limited. The large floats required clog the interior of the buckets, and in order to operate satisfactorily, require exceedingly large buckets.

Another object of this invention is to provide a valve in which it will not be necessary for the float to move the valve against the water pressure in the lateral; in other words, to provide a balanced valve in which the water pressure will be acting in both directions on the valve member so that the only effort necessary on the part of the float is to overcome the inertia of the valve and its operating mechanism.

With the improved valve the only adjustment necessary is an initial adjustment of the position of a float. No further adjustments during operation are required, as the valve itself will automatically provide a uniform supply regardless of variations in pressure or head of water.

The invention will be described as applied to a typical "bucket." It is to be understood that the same mechanism without change can be, and will be in most cases, also applied to the "standpipes" controlling the flow to the laterals.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the surface portion of a typical underground irrigation bucket;

Fig. 2 is an enlarged cross-section therethrough, illustrating the connection of the bucket with a conventional lateral pipe; and Fig. 3 is a vertical section of the bucket, taken on the line 3—3, Fig. 2.

In the drawing, a conventional underground irrigation lateral pipe is shown at 10, with an upwardly-extending, bucket-receiving nipple at 11. In the usual system employing concrete pipes, a cylindrical concrete bucket 12 is slipped over the upwardly extending nipple 11 and protrudes above the surface of the ground, as shown in Figs. 1 and 2.

The bucket 12 is provided with a plurality of outlet spouts 13 extending diametrically therefrom above the ground surface. Each of the outlet spouts 13 can be independently opened or closed by means of a slide valve 14 operating in a valve guide 15.

As thus far described, the structure shown is the conventional underground irrigation bucket. The invention comprises a dome-shaped metallic valve housing 16 provided with a bell-shaped skirt 17. In the usual installation the skirt 17 will rest directly upon the outlet nipple 11 in the bottom of the bucket 12 so that all water rising from the nipple will enter the valve housing 16.

The housing 16 is provided with two oppositely positioned outlet ports 18 and 19. The port 18 is surrounded by an inwardly extending annular valve seat 20, and the port 19 is surrounded by a similar valve seat 21 extending outwardly from the side of the housing 16. The ports 18 and 19 are controlled by means of disc valves 22 and 23, respectively. The disc valves are mounted in any desired manner upon a horizontally positioned valve stem 24 which is slidably supported adjacent the port 19 in a bearing sleeve 25. The bearing sleeve is carried on the lower extremity of a supporting arm 26 secured to and extending downwardly from the top of the valve housing 16. Each of the valve discs may be provided with a suitable sealing gasket 39.

The valve stem 24 extends through the port 18 and terminates in a hinge pin 27, by means of which it is hingedly secured to an inverted, L-shaped valve lever 28. The lower extremity of the valve lever 28 is pivoted at 29 in a bifurcated pivot lug 30 extending upwardly from the skirt 17 of the valve body. The lever 28 extends upwardly between the valve housing 16 and the wall of the bucket 12, thence extends inwardly partially over the housing 16, terminating in a pair of depending, swinging links 31.

The links 31 are hingedly attached at their lower extremities to a substantially horizontal float lever 32 which is hinged at its one extremity in a lever boss 33 on the top of the housing 16. A float rod 34 is hingedly secured at 35 to the other extremity of the float lever 32 and extends upwardly therefrom. A float 36 is adjustably mounted on the rod 34 and may be set in any desired vertical position thereon by means of a set screw 37.

It will be noted that the links 31 connect to the float lever 32 intermediate its extremities so that the vertical movements of the float are communicated to the horizontal extremity of the valve lever 28 with increased leverage and decreased amplitude. Since the lever 28 is hinged at its lower extremity, vertical movement of its horizontal extremity will result in substantially horizontal movement of the hinge pin 27. The substantially horizontal movement of the hinge pin 27 results, of course, through the valve stem 24 in horizontal movement of the valve discs 22 and 23 to control the amount of opening of the ports 18 and 19.

The valve discs 22 and 23 may be secured to the stem 24 in any desired manner, such as by means of threaded clamp nuts 38. If it is desired to have the valve discs fixedly mounted on the stem 24 before assembling, the opening 19 may be made slightly larger than the opening 18, and the valve disc 22 slightly smaller than the valve disc 23 so that the disc 22 may be passed through the opening 19.

The relative positions of the valve disc 22, hinge pin 27, and pivot 29 are such that the arcuate movement of the lever 28 will position the valve 22 flat against the seat 20 in the closed position.

The operation of the device is believed to be apparent from the above description. Briefly, the float 36 is set on the rod 34 at a point which will close the valves 22 and 23 when the water in the bucket 12 has reached the desired maximum level. Any recession in this level will cause the float 36 to descend, thereby simultaneously and equally opening both ports 18 and 19. The only effort required from the float is to move the valve discs through the water and overcome the friction of the bearings therein, for the water pressure on the valves is exactly and equally counterbalanced. It will be noted that the water pressure is acting on the opposite face of the valve disc 22 from the face that it is acting against on the valve 23, so that the pressures are counterbalanced.

While a specific form of the improvement has been described and illustrated herein, it is desired to be understood that the same may be varied, within the scope of the appended claims, without departing from the spirit of the invention.

Having thus described the invention what is claimed and desired secured by Letters Patent is:

1. A flow regulator for underground irrigation systems of the type having a buried horizontal distributing pipe discharging water into the bottom of a vertical riser pipe having discharge openings in its upper portion, comprising: a dome-shaped valve housing positioned in said riser pipe and covering the discharge of said distributing pipe, the wall of said housing being spaced inwardly from the wall of the riser pipe; a discharge port in each side of said housing, said ports being in horizontal and diametric alignment with each other; a valve seat surrounding each port; a valve stem extending between said ports; an inside valve member mounted on said stem to close against the inside of the first port; a second valve member mounted on said stem on the exterior of said housing positioned to close against the outside of the second port; a vertical lever hinged below the first port and extending upward above said housing, one extremity of said valve stem being hingedly connected to and supported by said lever; a float positioned above said housing; and means for converting the vertical movements of said float into horizontal movements of said lever.

2. A flow regulator for underground irrigation systems of the type having a buried horizontal distributing pipe discharging water into the bottom of a vertical riser pipe having discharge openings in its upper portion, comprising: a dome-shaped valve housing positioned in said riser pipe and covering the discharge of said distributing pipe, the wall of said housing being spaced inwardly from the wall of the riser pipe; a discharge port in each side of said housing, said ports being in horizontal and diametric alignment with each other; a valve seat surrounding each port; a valve stem extending between said ports; an inside valve member mounted on said stem to close against the inside of the first port; a second valve member mounted on said stem on the exterior of said housing positioned to close against the outside of the second port; a vertical lever hinged below the first port and extending upward above said housing, one extremity of said valve stem being hingedly connected to and supported by said lever, said lever having an inverted L-shaped contour with its upper extremity extending axially inward over said housing; a float lever hingedly mounted on the top of said housing below the upper extremity of said L-shaped lever and extending beyond the latter; links suspending said float lever from the extremity of said L-shaped lever; and a float secured to the extremity of said float lever and extending upwardly therefrom so that vertical movement of said float will swing said L-shaped lever to impart horizontal movement to said valve.

3. A bucket for distributing irrigation water from an upwardly extending nipple on an irrigation water conduit comprising: a cylindrical stand pipe fitted about said nipple and extending upwardly therefrom; distributing spouts opening from said stand pipe adjacent the top thereof; a dome-shaped, open-bottomed valve housing; a bell-shaped skirt surrounding the open bottom of said housing, said skirt resting on and sealing said stand pipe from said nipple, there being discharge ports in the opposite sides of said housing; a horizontally movable valve stem extending diametrically across said housing and projecting through both said ports; a valve mounted on said stem opposite each of said ports so that horizontal movement of said stem will open and close both ports simultaneously; a supporting arm supporting one extremity of said valve stem within said housing; a lever hinged below the other extremity of said stem on the exterior of said housing and hingedly supporting the other extremity of said valve stem, said lever extending upwardly between the housing and the stand pipe; and float-actuated means mounted on said housing within said stand pipe operatively connected to said lever for actuating said valves.

4. A bucket for distributing irrigation water from an upwardly extending nipple on an irrigation water conduit comprising: a cylindrical stand pipe fitted about said nipple and extending upwardly therefrom; distributing spouts opening from said stand pipe adjacent the top thereof; a dome-shaped, open-bottomed valve housing; a bell-shaped skirt surrounding the open bottom of said housing, said skirt resting on and sealing said stand pipe from said nipple, there being discharge ports in the opposite sides of said housing; a horizontally movable valve stem extending diametrically across said housing and projecting through both said ports; a valve mounted on said stem opposite each of said ports so that horizontal movement of said stem will open and close both ports simultaneously; a supporting arm supporting one extremity of said valve stem within said housing; a lever hinged below the other extremity of said stem on the exterior of said housing and hingedly supporting the other extremity of said valve stem, said lever extending upwardly between the housing and the stand pipe; a substantially horizontal float lever hinged on said housing and extending diametrically thereof; a float supporting one extremity of said float lever; and connecting means between said float lever and said first lever for transmitting the vertical movements of said float into horizontal movements of said valve stem.

5. A bucket for distributing irrigation water from an upwardly extending nipple on an irrigation water conduit comprising: a cylindrical stand pipe fitted about said nipple and extending upwardly therefrom; distributing spouts opening from said stand pipe adjacent the top thereof; a dome-shaped, open-bottomed valve housing; a bell-shaped skirt surrounding the open bottom of said housing, said skirt resting on and sealing said stand pipe from said nipple, there being discharge ports in said housing; valve means controlling said ports; a float lever hinged at its one extremity on and extending diametrically across the top of said housing; a float supporting the free extremity of said lever; and means communicating the movements of said float lever to said valve means for opening and closing the latter, said float, float lever, and communicating means all being confined within said stand pipe.

MERLE IRVINE.

REFERENCES CITED

The following references are of record in the file of this patent:

UNITED STATES PATENTS

| Number | Name | Date |
|---|---|---|
| 520,150 | Turner | May 22, 1894 |
| 1,851,016 | Skelly | Mar. 29, 1932 |